US011009315B1

(12) United States Patent
Huang et al.

(10) Patent No.: US 11,009,315 B1
(45) Date of Patent: May 18, 2021

(54) LASER TARGET POINTER

(71) Applicant: Quarton Inc., Taipei (TW)

(72) Inventors: Chao Chi Huang, Taipei (TW); Liang Chiang Chen, Taipei (TW)

(73) Assignee: Quarton, Inc.

( * ) Notice: Subject to any disclaimer, the term of this patent is extended or adjusted under 35 U.S.C. 154(b) by 0 days.

(21) Appl. No.: 16/940,002

(22) Filed: Jul. 27, 2020

(30) Foreign Application Priority Data

Dec. 10, 2019 (TW) ................................ 108216407

(51) Int. Cl.

| | |
|---|---|
| ***F41G 1/35*** | (2006.01) |
| ***F21V 21/30*** | (2006.01) |
| ***F21S 9/02*** | (2006.01) |
| ***F21V 21/096*** | (2006.01) |
| ***F21V 23/04*** | (2006.01) |
| ***G02B 23/16*** | (2006.01) |
| ***F21Y 115/30*** | (2016.01) |
| ***F21Y 115/10*** | (2016.01) |

(52) U.S. Cl.

CPC .................. *F41G 1/35* (2013.01); *F21S 9/02* (2013.01); *F21V 21/096* (2013.01); *F21V 21/30* (2013.01); *F21V 23/04* (2013.01); *G02B 23/16* (2013.01); *F21Y 2115/10* (2016.08); *F21Y 2115/30* (2016.08)

(58) Field of Classification Search

CPC ... F41G 1/35; F41G 1/36; F41G 1/345; F41G 1/34; F21S 9/02; F21V 33/0076

See application file for complete search history.

(56) References Cited

U.S. PATENT DOCUMENTS

| | | | | | |
|---|---|---|---|---|---|
| 5,425,299 | A * | 6/1995 | Teetzel | F41A 9/62 | 42/1.02 |
| 5,584,137 | A * | 12/1996 | Teetzel | F41A 9/62 | 362/114 |
| 5,669,174 | A * | 9/1997 | Teetzel | F41A 9/62 | 356/5.01 |
| 5,685,105 | A * | 11/1997 | Teetzel | F41A 9/62 | 362/114 |
| 6,276,088 | B1 * | 8/2001 | Matthews | F21L 4/005 | 362/110 |
| 2008/0134562 | A1 * | 6/2008 | Teetzel | F41G 11/003 | 42/146 |
| 2015/0276347 | A1 * | 10/2015 | Sharrah | F21V 23/0414 | 42/117 |
| 2017/0205194 | A1 * | 7/2017 | Teetzel | F41G 1/02 | |
| 2018/0094900 | A1 * | 4/2018 | Sharrah | F41A 19/11 | |
| 2020/0200508 | A1 * | 6/2020 | Teetzel | F41G 3/2655 | |

* cited by examiner

*Primary Examiner* — William N Harris

(57) ABSTRACT

A laser target pointer comprises a case, a lighting module, a laser module, an operating module, an adjustment mechanism and a magnetic switch. The adjustment mechanism is equipped with a biaxial pivoting mechanism to adjust the position of the laser aiming point of the laser module. The magnetic switch can be magnetically attracted and detachably connected with a contact block and electrically connected to the laser target pointer. The power of the laser target pointer can be conveniently turned on or off by operating the magnetic switch. The lighting module comprises a plurality of invisible light emitting diodes having different divergence angles in order to provide different irradiation distances. The operating module comprises a plurality of luminous patterns each corresponding to an operation function, such that the user can clearly and quickly identify which one of the operation functions is currently enabled.

16 Claims, 11 Drawing Sheets

1 13 10 15 11 12 31 32 30 32 32 61 51 50 53 52 121 141b 141a 14 522

LASER TARGET POINTER

BACKGROUND OF INVENTION

1. Field of the Invention

The invention relates to a laser target pointer, and more particularly to the laser target pointer that can be assembled onto a gun so as to provide an auxiliary aiming function to a gun shooting path of the gun.

2. Description of the Prior Art

Except as a weapon that accelerates a bullet by exploding gunpowder thereinside, the gun can be particularly structured for recreations and/or games (a paintball gun or an air gun, for example), and can be, but not limited to, pneumatically powered by a compressed air bottle. In order to raise the shooting accuracy, gun manufacturers have developed versatile laser target pointers individually equipped onto a gun body of the gun for emitting a laser beam to demonstrate a corresponding shooting path and direction, such that an auxiliary aiming function can be provided. However, existing laser target pointers still have many structural shortcomings, such like: the adjustment mechanism of laser alignment is complicated, the operation of functional buttons and switches is inconvenient, the illumination distance or range of invisible light is limited, the visibility of the functional menu is not good, and etc. Thus, an improvement of the laser target pointer to overcome the aforesaid shortcomings is definitely necessary.

SUMMARY OF THE INVENTION

Accordingly, it is the primary objective of the present invention to provide a laser target pointer for a gun, which comprises an adjustment mechanism equipped with a biaxial pivoting mechanism to adjust the position of the laser aiming point of the laser module; in addition, the biaxial pivoting mechanism has the advantages of simple structure, easy assembly, and easy adjustment.

Another objective of the present invention is to provide a laser target pointer for a gun, which comprises a magnetic switch with connecting cable. It can be magnetically attracted and detachably connected with a contact block provided on the laser target pointer and then electrically connected to the laser target pointer. The power of the laser target pointer can be conveniently turned on or off by operating the magnetic switch with connecting cable.

A further objective of the present invention is to provide a laser target pointer for a gun, which comprises a plurality of invisible light emitting diodes; the divergence angles of the invisible illumination light emitted by the plurality of invisible light emitting diodes are different from each other, so as to meet the lighting requirements of different irradiation distances.

Yet another objective of the present invention is to provide a laser target pointer for a gun, which comprises a plurality of luminous patterns. Each of the patterns corresponds to at least one operation function. By pressing the operation buttons of the laser target pointer, one or some of the plurality of patterns can emit light of a predetermined color, such that the user can clearly and quickly identify which one of the operation functions of the laser target pointer is currently enabled. Wherein, at least one of the patterns can emit at least two different colors of light, such that a single pattern can be used to identify at least two different operation functions.

In order to achieve the aforementioned objectives, the present invention provides a laser target pointer which comprises: a case, a lighting module, a laser module, a power module, an operating module and an adjustment mechanism. The lighting module is located in the case and comprises at least one light emitting element for emitting illumination light forwardly out from the case. The laser module is located inside the case and comprises at least one laser unit for emitting laser beam forwardly out from the case. The power module is located inside the case and is electrically connected to the lighting module and the laser module to provide electric power to the at least one light emitting element and the at least one laser unit. The operating module is electrically connected to the power module and comprises at least one button which can be pressed by a user in order to operate the laser target pointer. The adjustment mechanism is connected with the laser module for adjusting a position of a laser aiming point of a laser beam emitted by the at least one laser unit of the laser module. The adjustment mechanism comprises a biaxial pivoting mechanism, a first adjusting screw set and a second adjusting screw set. Wherein, a side surface of the laser module is pivotally coupled to the biaxial pivoting mechanism, such that the laser module can use the biaxial pivoting mechanism as a pivot to perform biaxial pivoting movements according to a first axis and a second axis. Wherein, the first adjusting screw set is disposed on the side surface of the laser module in such a manner that, by rotating the first adjusting screw set, the side surface of the laser module will be pushed by the first adjusting screw set to rotate around the first axis using the biaxial pivoting mechanism as the pivot; in addition, the second adjusting screw set is disposed on a bottom surface of the laser module in such a manner that, by rotating the second adjusting screw set, the bottom surface of the laser module will be pushed by the second adjusting screw set to rotate around the second axis using the biaxial pivoting mechanism as the pivot. Wherein, by rotating the first adjusting screw set and the second adjusting screw set, the laser module can perform biaxial pivoting movements using the biaxial pivoting mechanism as the pivot, so as to adjust the position of the laser aiming point of the laser beam emitted by the at least one laser unit.

In a preferred embodiment, the biaxial pivoting mechanism comprises a fixed axis and a sleeve axis; the fixed axis extends along a first direction and is fixed to the case; the sleeve axis has a through hole extending in the first direction and a shaft portion extending in a second direction, wherein the second direction is perpendicular to the first direction; the through hole of the sleeve axis is sleeved on the fixed axis in a pivotable manner, so that the sleeve axis can perform pivoting movements around the first axis about the fixed axis; the side surface of the laser module is pivotally coupled to the shaft portion of the sleeve axis, so that the laser module can perform the pivoting movements around the second axis about the shaft portion of the sleeve axis. Wherein, the first adjusting screw set comprises a first screw and a first pushing block; by rotating the first screw, the first pushing block can be driven to push the side surface of the laser module in order to cause the laser module together with the sleeve axis to pivot around the first axis by using the fixed axis as the pivot. Wherein, the second adjusting screw set comprises a second screw and a second pushing block; by rotating the second screw, the second pushing block can be driven to push the bottom surface of the laser module in order to cause the laser module to pivot around the second axis by using the shaft portion of the sleeve axis as the pivot. Wherein, the adjustment mechanism further comprises at least one position retaining element for providing an elastic pushing force to the laser module, so that, when the first screw and the second screw stop rotating, the position of the laser module can be maintained by the elastic pushing force of the at least one position retaining element.

In a preferred embodiment, a flat bottom groove extending along the first direction is formed on the side surface of the laser module, in addition, the first pushing block has a square shape with a width substantially matching the width of the flat bottom groove; the first pushing block is located in the flat bottom groove and abuts against the flat bottom groove; the position retaining element is a conical coil spring which abuts the laser module and the case for providing the elastic pushing force to laser module, so that the first pushing block and the second pushing block can keep pressing against the laser module.

In a preferred embodiment, the case comprises: a main body, a lower cover and a front cover; the lower cover is assembled and fixed under the main body, while the front cover is connected to a front side of the main body in a detachable manner; the power module comprises at least a battery and is received inside the main body; the front cover is locked to the front side of the main body by a clipping mechanism; when the clipping mechanism is unlocked, the front cover can be detached from the main body in order to expose the at least one battery for battery replacement; the laser module and the adjustment mechanism are located in the lower cover, and are electrically connected to the power module through an top-pressing circuit board; the top-pressing circuit board is provided with various electronic components for controlling the laser target pointer; the laser target pointer further comprises an adjustable fixing rack disposed on a top surface of the main body; the fixing rack is for mounting the laser target pointer onto a carrier in a detachable manner.

In a preferred embodiment, the laser target pointer further comprises a magnetic switch with connecting cable which is magnetically and detachably connected to a contact block provided on a rear side of the lower cover of the case and is further electrically connected to the top-pressing circuit board; the magnetic switch with connecting cable comprises: a magnetic attraction head, an operation box and a connecting cable extending and connecting between the magnetic attraction head and the operating box; the contact block is located in the lower cover and comprises: a hollow outer ring sleeve fixed in the contact block, a ring magnet fixed in the outer ring sleeve, a spacer having a small hole in the center, and a conductive post inserted into the small hole of the spacer and having a front end of the conductive post to protrude out of the spacer; the spacer has a non-conductive inner ring portion adjacent to the small hole, and an electrically and magnetically conductive metal outer ring portion surrounding the inner ring portion; the outer ring portion of the spacer is attracted by the magnetic force of the ring magnet and contacts the ring magnet in order to provide an electric conducting function; an operation button is provided on the operation box; the magnetic attraction head has a container structure furnished with electrically and magnetically conductive components therein; when the magnetic attraction head of the magnetic switch with connecting cable is magnetically attracted by the ring magnet and combined with the contact block, a control signal can be generated and transmitted to the top-pressing circuit board by pressing the button on the operation box, in order to perform the operation of turning on or off the power supply of the laser target pointer.

In a preferred embodiment, the at least one laser unit of the laser module includes a visible-light laser diode and an invisible-light laser diode used for emitting visible laser beam and invisible laser beam respectively; the at least one light emitting element of the lighting module includes a visible light emitting diode and a plurality of invisible light emitting diodes; the visible light emitting diode is located on the front cover and is used to emit visible illumination light; the plurality of invisible light emitting diodes are respectively located on the lower cover and the front cover and are used to emit invisible illumination light; wherein, divergence angles of the invisible illumination light emitted by the plurality of invisible light emitting diodes are different in order to meet lighting requirements of different illumination distances and divergent angles.

In a preferred embodiment, the operating module is electrically connected to the top-pressing circuit board and includes: a plurality of buttons and a plurality of patterns which can be switched between a luminous status and a darkness status; each of the patterns corresponds to at least one operation function; by pressing one or more said buttons, one or some of the patterns will be switched to the luminous status for emitting light of a predetermined color in order to identify which operation function or functions of the laser target pointer are currently enabled; wherein, at least one of the patterns can emit at least two different colors of light, so that a single said pattern can be used to identify at least two different said operation functions.

In a preferred embodiment, the plurality of buttons are provided on the lower cover; the plurality of patterns are arranged on a back cover of the main body and comprise: an illumination pattern, a lasing pattern, a power-on pattern, and an invisible light pattern. Wherein, when performing visible light operation selections, a bright white light of the illumination pattern indicates that a visible light illumination function of the lighting module is selected; a green light of the laser pattern indicates that a visible laser function of the laser module is selected; both the visible light illumination function and the visible light laser function can be selected independently, or both can be selected at the same time. When performing invisible light operation selections, a red light of the invisible light pattern indicates that an invisible light illumination function of the lighting module is selected; an orange light of the laser pattern indicates that an invisible laser function of the laser module is selected; both the invisible light illumination function and the invisible light laser function can be selected independently, or both can be selected at the same time. The visible light illumination function and the invisible light illumination function cannot be selected at the same time; in addition, the visible laser function and the invisible laser function cannot be selected at the same time. When the power-on pattern lights up in blue, it means that the selected function(s) is/are being activated. Wherein, two sets of the patterns are respectively provided on a left half and a right half of the back cover, in addition, two sets of buttons are respectively provided on a left half and a right half of the lower cover; such that, different users with a left-handed gun and a right-handed gun can conveniently operate the buttons and view the plurality of patterns.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention discloses a laser target pointer for a gun, which comprises a case, a lighting module, a laser module, an operating module, an adjustment mechanism and a magnetic switch with connecting cable. The adjustment mechanism equipped with a biaxial pivoting mechanism to adjust the position of the laser aiming point of the laser module; in addition, the biaxial pivoting mechanism has the advantages of simple structure, easy assembly, and easy adjustment. The magnetic switch with connecting cable can be magnetically attracted and detachably connected with a contact block provided on the laser target pointer and then electrically connected to the laser target pointer. The power of the laser target pointer can be conveniently turned on or off by operating the magnetic switch with connecting cable. The lighting module comprises a plurality of invisible light emitting diodes; the divergence angles of the invisible illumination light emitted by the plurality of invisible light emitting diodes are different from each other, so as to meet the lighting requirements of different irradiation distances. The operating module comprises a plurality of operation buttons and luminous patterns. Each of the patterns corresponds to at least one operation function. By pressing the operation buttons, one or some of the plurality of patterns can emit light of a predetermined color, such that the user can clearly and quickly identify which one of the operation functions of the laser target pointer is currently enabled. Wherein, at least one of the patterns can emit at least two different colors of light, such that a single pattern can be used to identify at least two different operation functions. With the above-mentioned novel design, the laser target pointer of the present invention has indeed improved the deficiencies of the conventional technologies.

In order to more clearly disclose the laser target pointer of the present invention, preferred embodiments will be described in detail below together with related drawings.

Figure 1A:
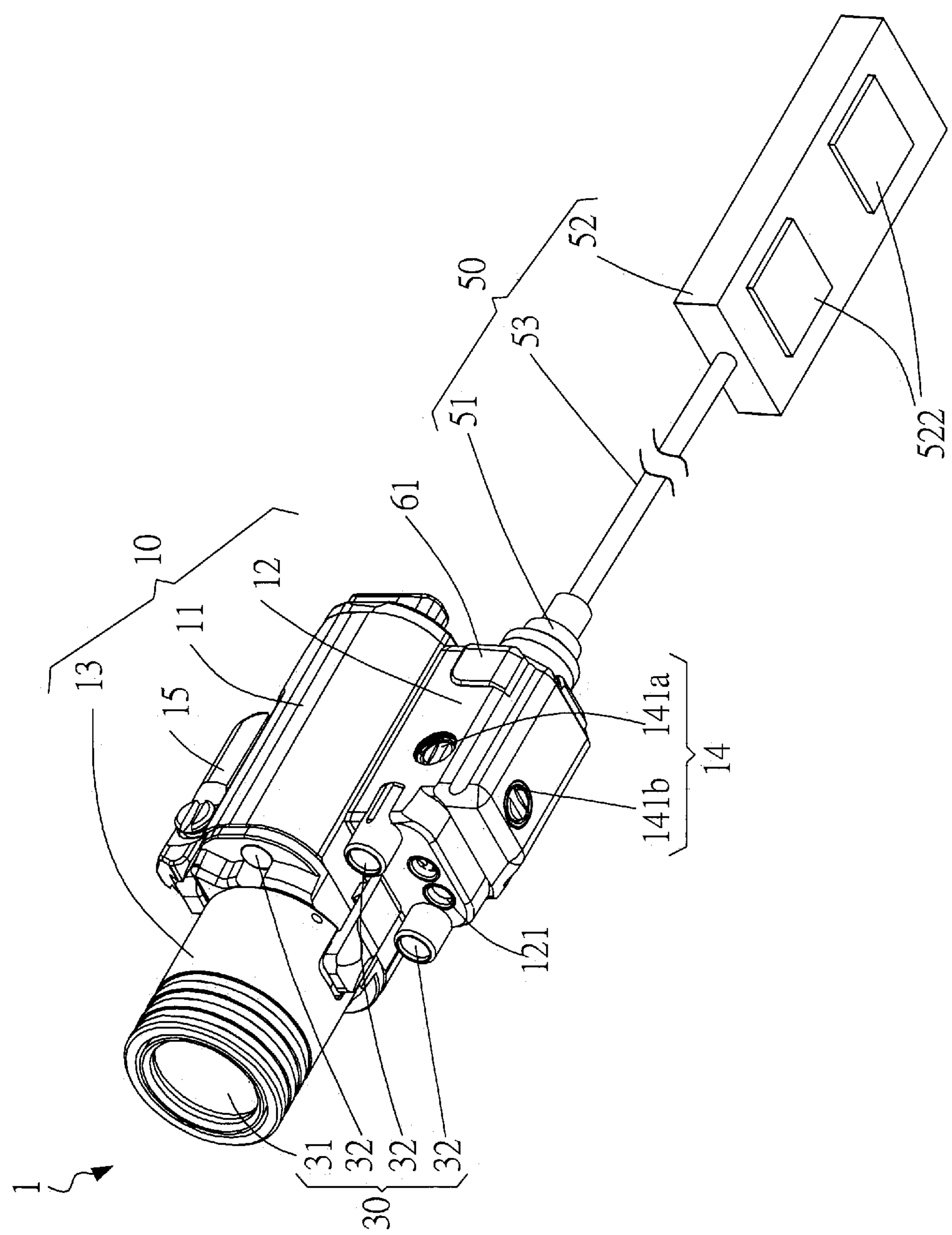
FIG. 1A is perspective view of an embodiment of an assembled laser target pointer of the present invention.
Figure 1B:
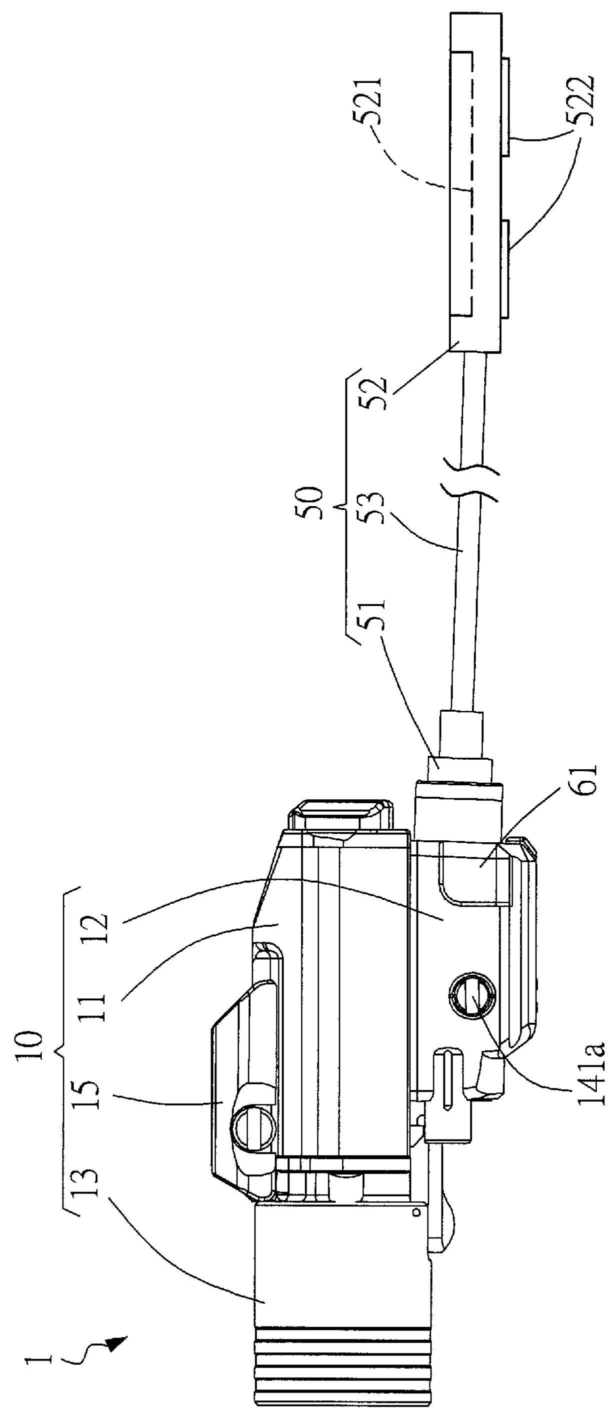
FIG. 1B is a right side view of the embodiment of assembled laser target pointer of the present invention.
Figure 2A:
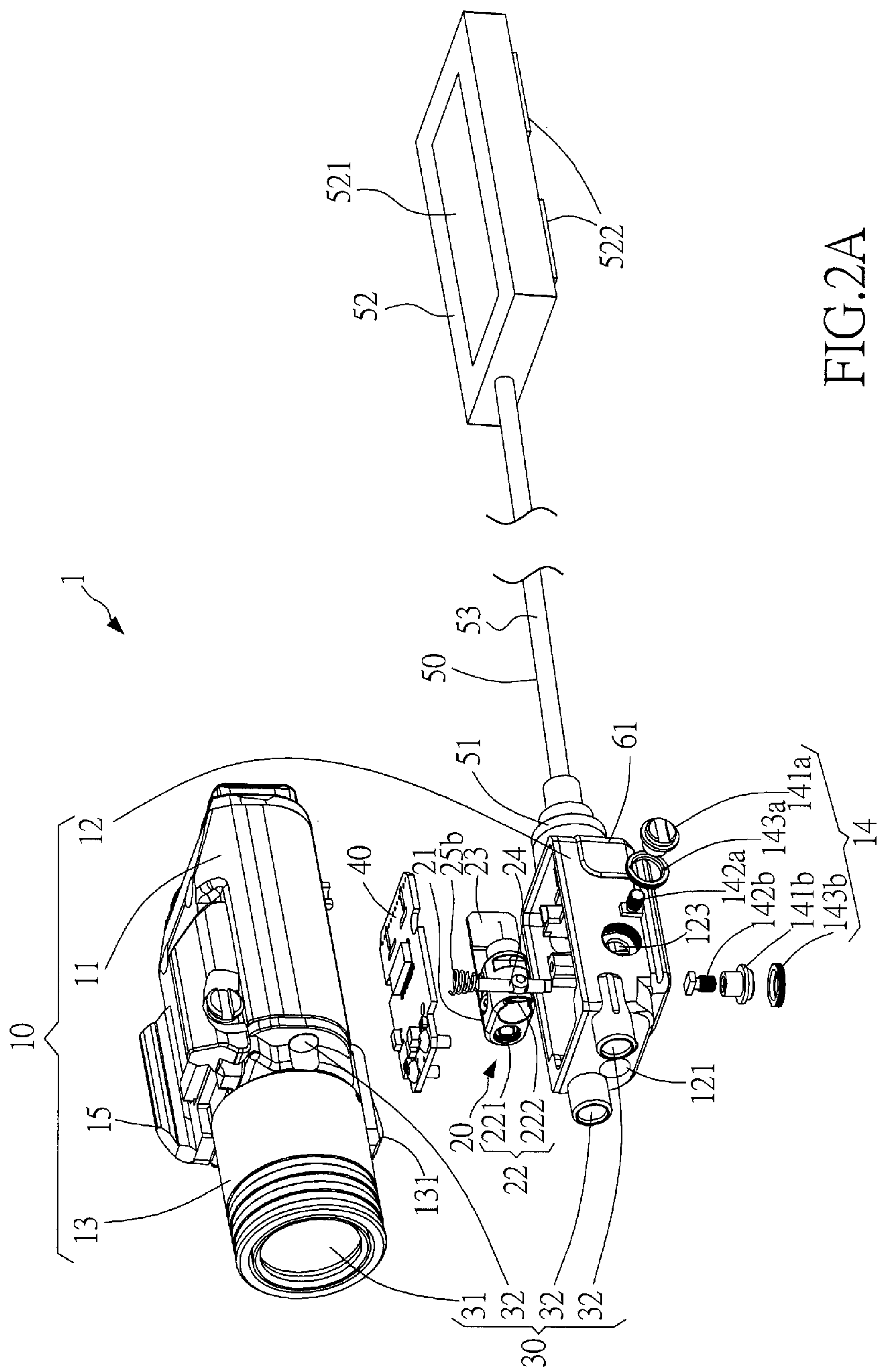
FIG. 2A is an exploded perspective view of the embodiment of laser target pointer of the present invention (the lower cover is separated from the main body)
Figure 2B:
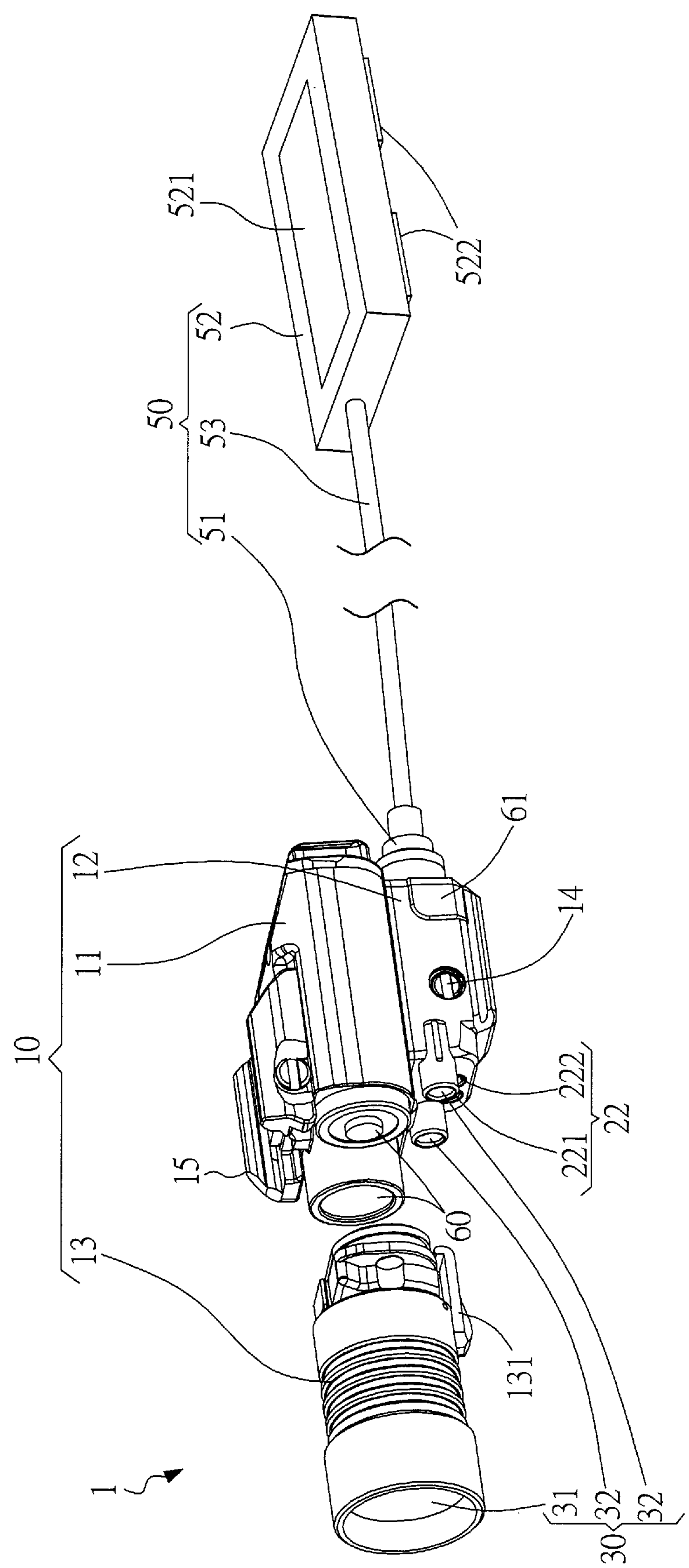
FIG. 2B is another exploded perspective view of the embodiment of laser target pointer of the present invention (the front cover is separated from the main body)
Figure 3B:
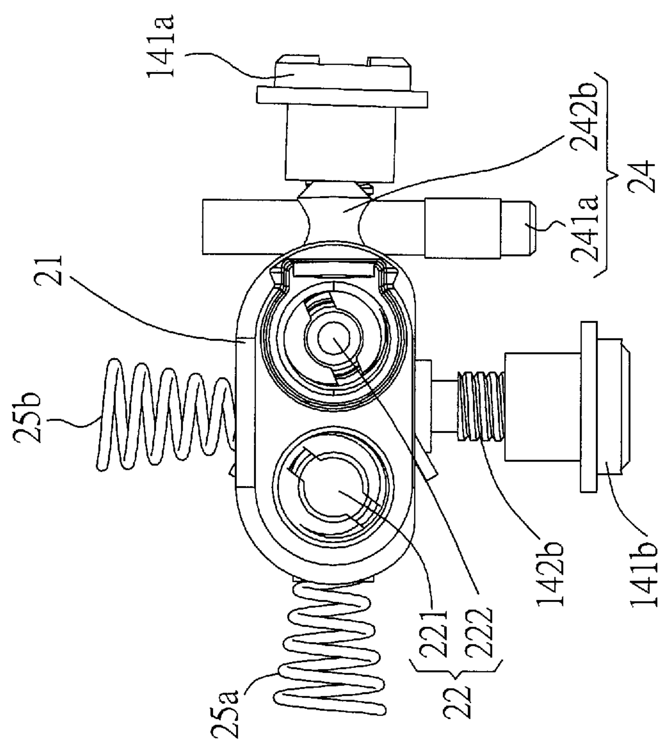
FIGS. 3A to 3C are respectively an assembled perspective view, an assembled front side view, and an exploded perspective view of the laser module and the adjustment module of the laser target pointer of the present invention.
Figure 3A:
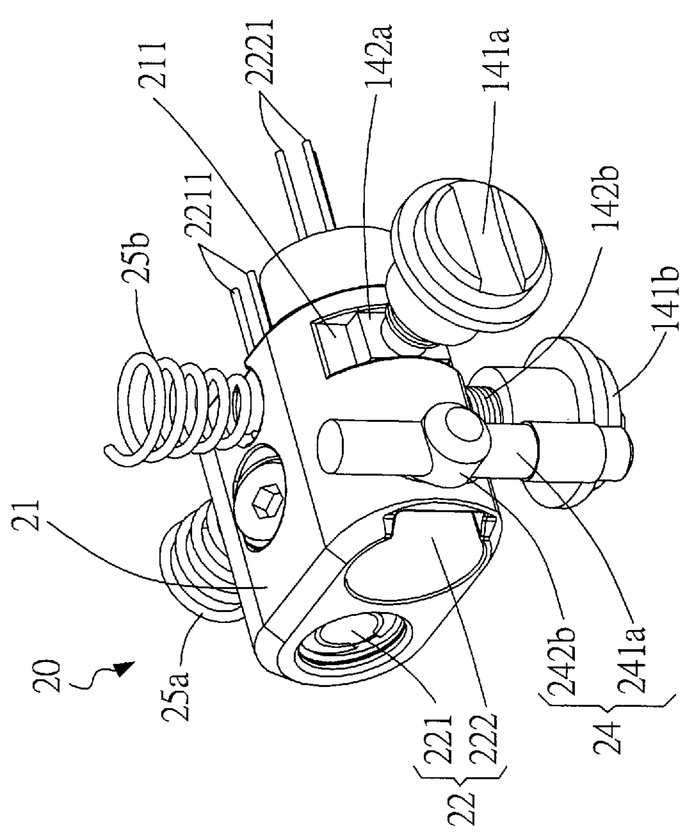
Figure 3C:
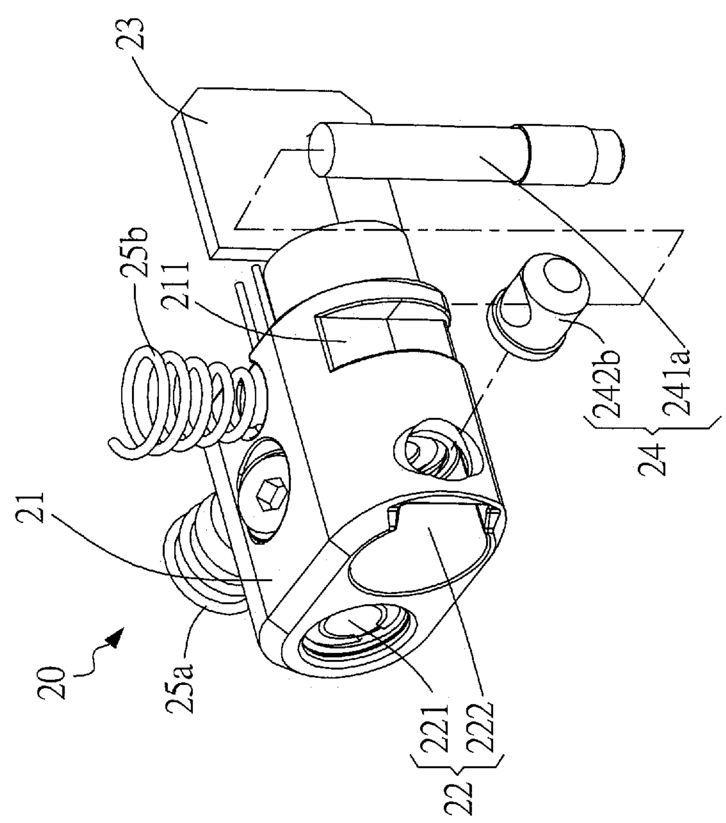
Figure 5:
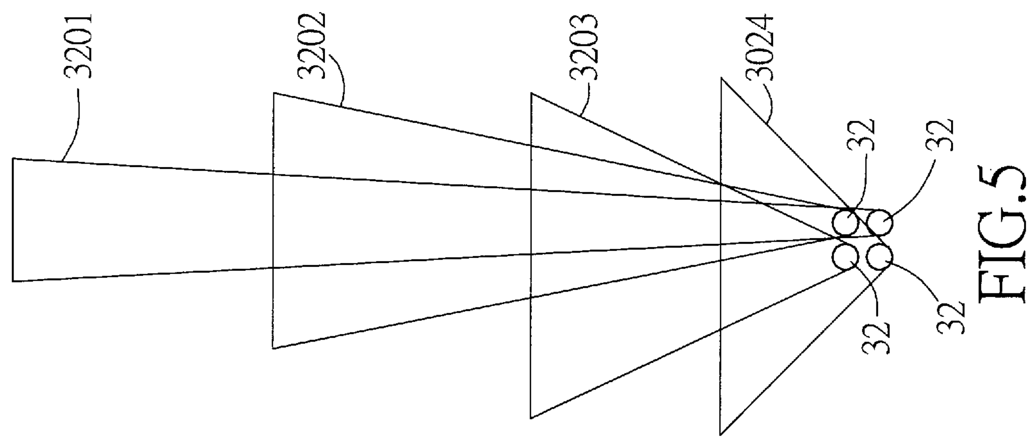
FIG. 5 is a schematic drawing showing an example of different illumination distances and divergence angles caused by the plurality of invisible light emitting diodes of the laser target pointer of the present invention.
Figure 4:
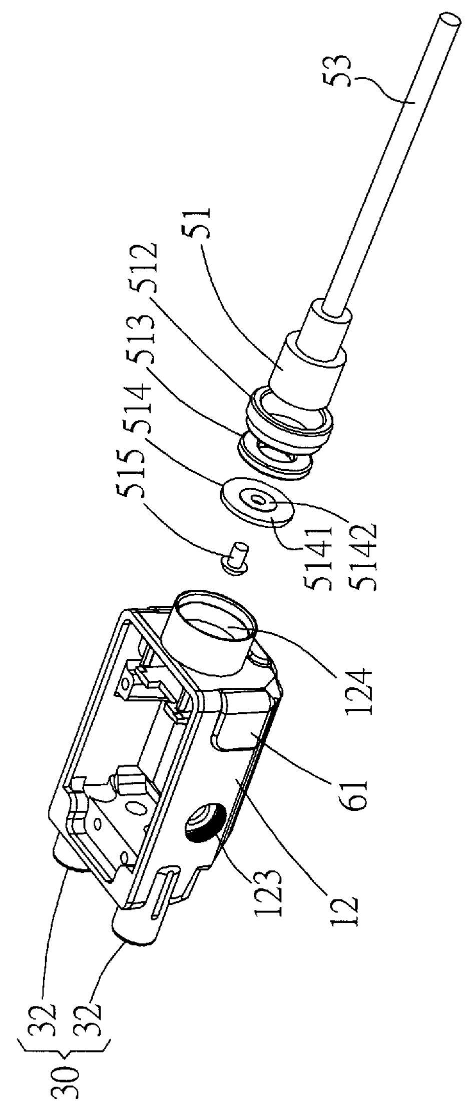
FIG. 4 is an exploded perspective view of the magnetic switch with connecting cable of the laser target pointer of the present invention.
Figure 6B:
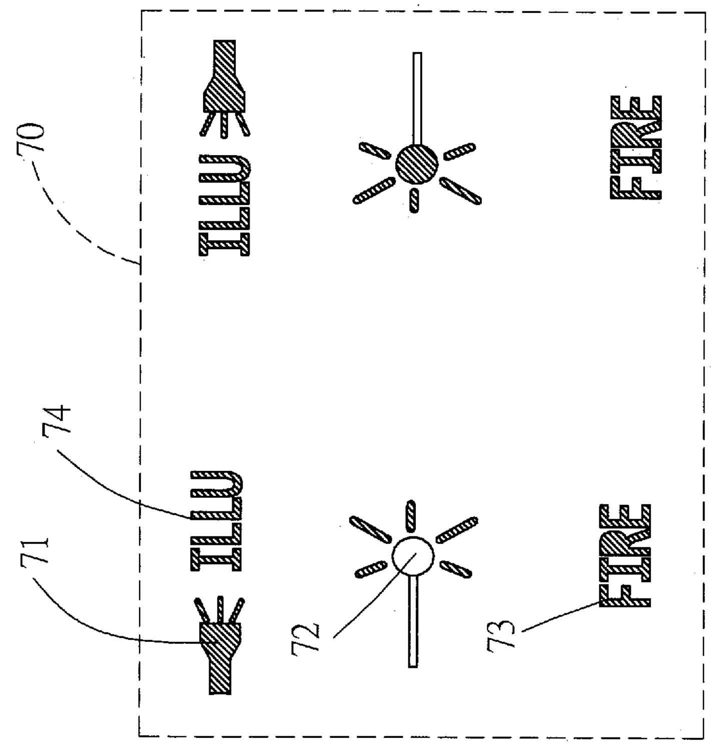
FIGS. 6A and 6B are schematic drawings respectively showing the positions and the enlarged schematic views of the luminous patterns furnished on the case of the laser target pointer of the present invention.
Figure 6A:
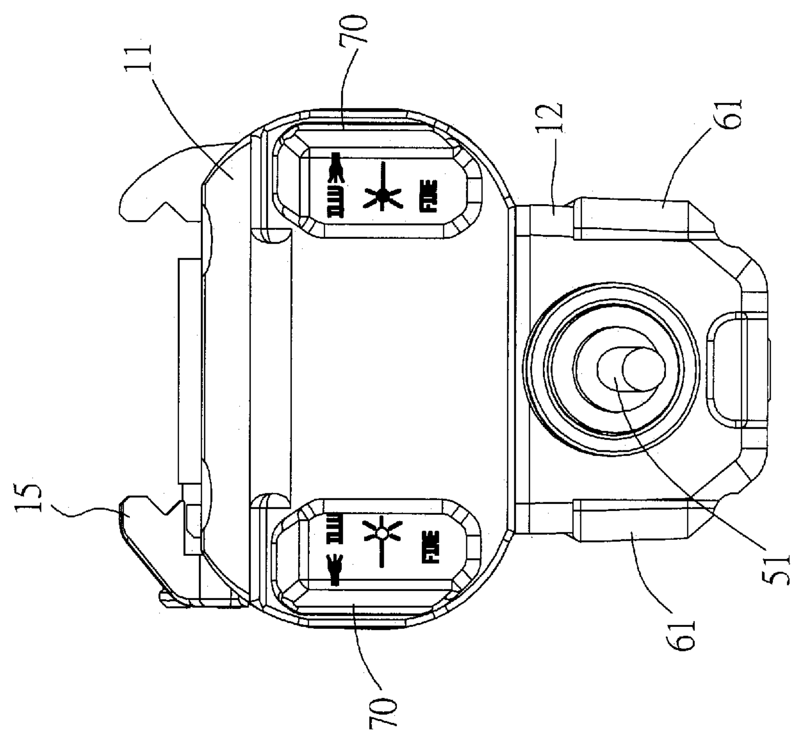
Figure 7A:
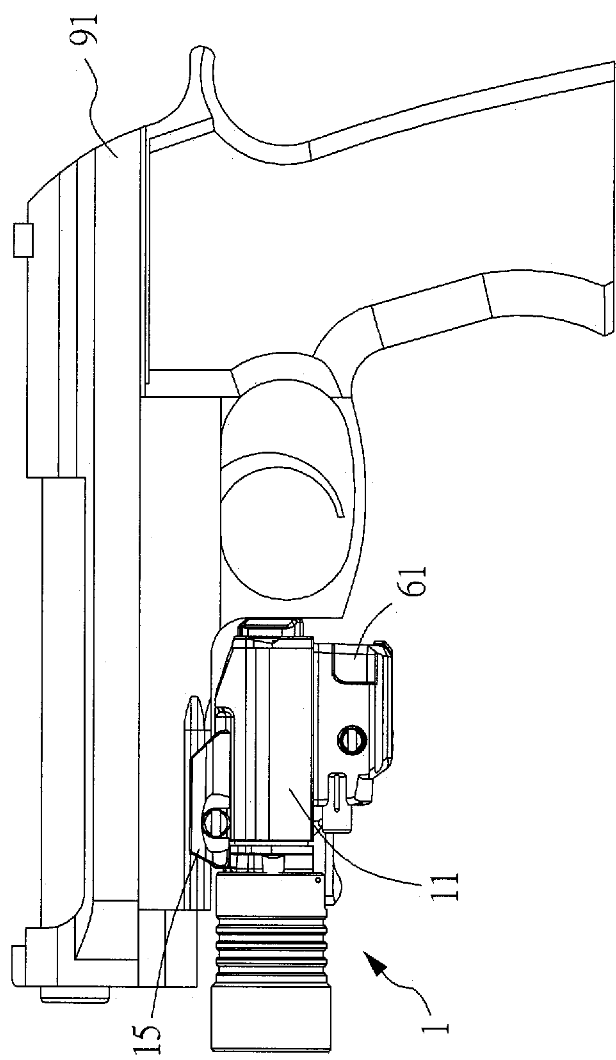
FIGS. 7A and 7B are schematic drawings respectively showing the laser target pointer of the present invention being equipped on a pistol and a rifle.
Figure 7B:
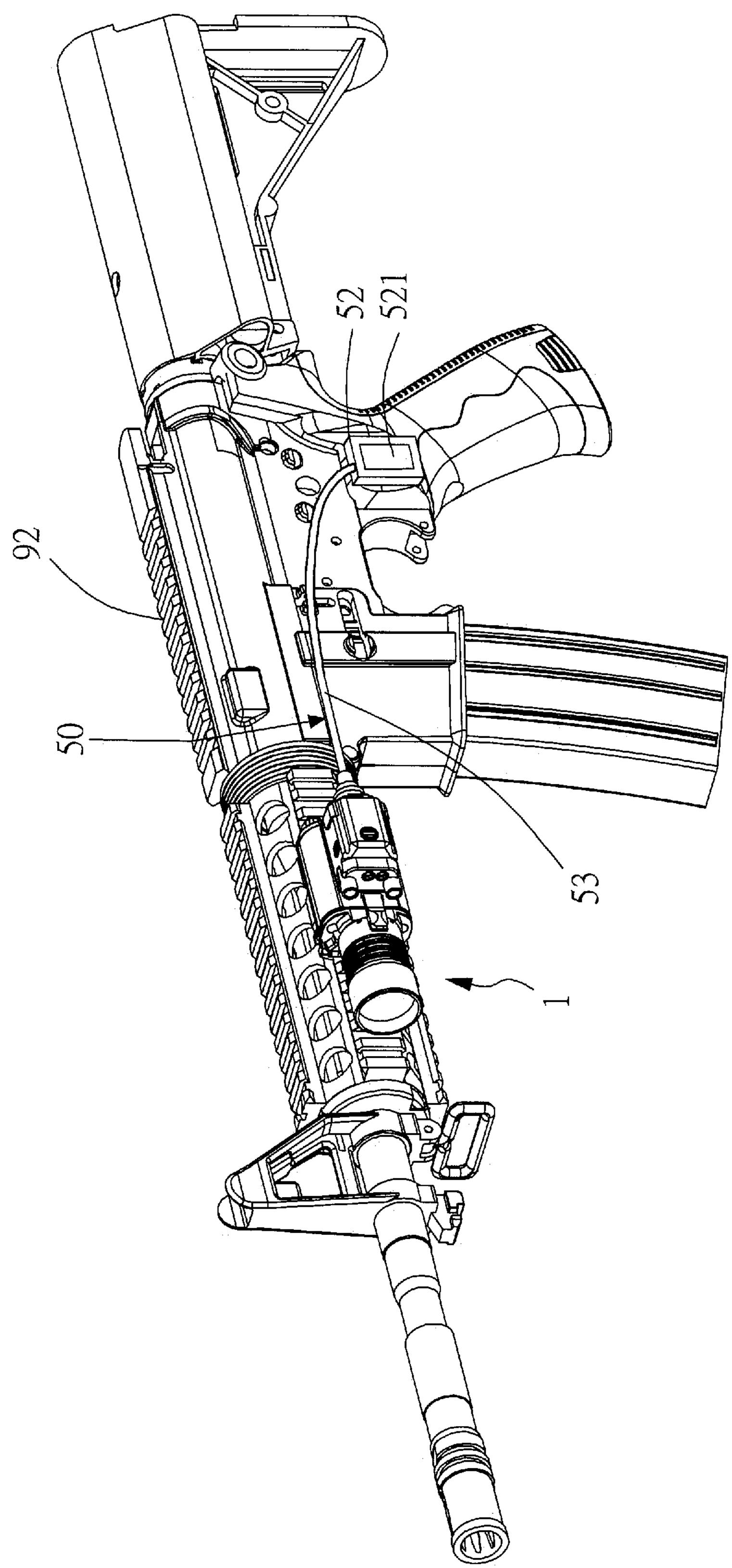

Please refer to FIG. 1A to FIG. 7B, which disclose a preferred embodiment of the laser target pointer 1 in accordance with the present invention. In which, FIG. 1A is perspective view of an embodiment of an assembled laser target pointer of the present invention. FIG. 1B is a right side view of the embodiment of assembled laser target pointer of the present invention. FIG. 1C is a front side view of the embodiment of assembled laser target pointer of the present invention. FIG. 2A is an exploded perspective view of the embodiment of laser target pointer of the present invention (the lower cover is separated from the main body). FIG. 2B is another exploded perspective view of the embodiment of laser target pointer of the present invention (the front cover is separated from the main body). FIGS. 3A to 3C are respectively an assembled perspective view, an assembled front side view, and an exploded perspective view of the laser module and the adjustment module of the laser target pointer of the present invention. FIG. 4 is an exploded perspective view of the magnetic switch with connecting cable of the laser target pointer of the present invention. FIG. 5 is a schematic drawing showing an example of different illumination distances and divergence angles caused by the plurality of invisible light emitting diodes of the laser target pointer of the present invention. FIGS. 6A and 6B are schematic drawings respectively showing the positions and the enlarged schematic views of the luminous patterns furnished on the case of the laser target pointer of the present invention. FIGS. 7A and 7B are schematic drawings respectively showing the laser target pointer of the present invention being equipped on a pistol and a rifle.

As shown in FIGS. 1A to 1C, FIG. 2A and FIG. 2B, in a preferred embodiment of the present invention, the laser target pointer 1 comprises: a case 10, a laser module 20, a lighting module 30, a magnetic switch with connecting cable 50, a power module 60, an operating module (unnumbered), and an adjustment mechanism 14.

The case 10 comprises: a main body 11, a lower cover 12 and a front cover 13. The lower cover 12 is assembled and fixed under the main body 11, while the front cover 13 is connected to a front side of the main body 11 in a detachable manner. The power module 60 comprises at least a battery and is received inside the main body 11. The front cover 13 is locked to the front side of the main body 11 by a clipping mechanism 131. When the clipping mechanism 131 is unlocked, the front cover 13 can be detached from the main body 11 in order to expose the at least one battery (power module 60) located in the main body 11 for battery replacement. The laser module 20 and the adjustment mechanism 14 are located in the lower cover 12, and are electrically connected to the power module 60 through an top-pressing circuit board 40. The top-pressing circuit board 40 is provided with various electronic components for controlling the laser target pointer 1. The laser target pointer 1 further comprises an adjustable fixing rack 15 disposed on a top surface of the main body 11. The fixing rack 15 is for mounting the laser target pointer 1 onto a carrier in a detachable manner. The carrier can be, but not limited to, a pistols, rifle, paintball gun, air gun or other carrier that can be connected by the fixing rack 15. Since the front cover 13 is opened from the front side of the case 10 to replace the battery, even when the laser target pointer 1 of the present invention is mounted on a carrier (such like a pistol 91 shown in FIG. 7A), the front cover 13 can still be opened for replacing the battery without the need to remove the laser target pointer 1 from the carrier first, which is very convenient for battery replacement.

The lighting module 30 is located in the case 10 and comprises at least one light emitting element 31, 32, and can emit illumination light forwardly out from the case 10. The laser module 20 is located inside the lower cover 12 of the case 10 and comprises at least one laser unit 22, and can emit laser beam forwardly out from the case 10. The power module 60 is located within the main body 11 of the case 10 and is electrically connected to the lighting module 30 and the laser module 20 to provide electric power to the at least one light emitting element 31, 32 and the at least one laser unit 22. The operating module is electrically connected to the power module 60. The operating module comprises at least one button 61 which can be pressed by user in order to operate the power switch and other functions of the laser target pointer 1.

As shown in FIG. 3A and FIG. 3B, the adjustment mechanism 14 is connected with the laser module 20, and can be used for adjusting the position of the laser aiming point of laser beam emitted by the at least one laser unit 22 of the laser module 20. In this embodiment, the adjustment mechanism 14 comprises: a biaxial pivoting mechanism 24, a first adjusting screw set and a second adjusting screw set. One side surface of the laser module 20 is pivotally coupled to the biaxial pivoting mechanism 24, such that the laser module 20 can use the biaxial pivoting mechanism 24 as a pivot to perform biaxial pivoting movements according to a first axis and a second axis. The first adjusting screw set is disposed on the side surface of the laser module 20 in such a manner that, by rotating the first adjusting screw set, the side surface of the laser module 20 will be pushed by the first adjusting screw set to rotate around the first axis using the biaxial pivoting mechanism 24 as a pivot. In addition, the second adjusting screw set is disposed on a bottom surface of the laser module 20 in such a manner that, by rotating the second adjusting screw set, the bottom surface of the laser module 20 will be pushed by the second adjusting screw set to rotate around the second axis using the biaxial pivoting mechanism 24 as a pivot. Therefore, by rotating the first adjusting screw set and the second adjusting screw set, the laser module 20 can perform biaxial pivoting movements using the biaxial pivoting mechanism 24 as a pivot, so as to adjust the position of the laser aiming point of the laser beam emitted by the at least one laser unit 22, and thus calibrate the aiming accuracy of the laser beam as well as the bullet flight path when the gun is shooting.

As shown in FIG. 3C, in this embodiment, the biaxial pivoting mechanism 24 comprises: a fixed axis 241*a* and a sleeve axis 242*b*. The fixed axis 241*a* extends along a first direction and is fixed in the lower cover 12 of the case 10. The sleeve axis 242*b* has a through hole extending in the first direction and a shaft portion extending in a second direction, wherein the second direction is perpendicular to the first direction. The through hole of the sleeve axis 242*b* is sleeved on the fixed axis 241*a* in a pivotable manner, so that the sleeve axis 242*b* can perform the pivoting movement around the first axis about the fixed axis 241*a*. The side surface of the laser module 20 is pivotally coupled to the shaft portion of the sleeve axis 242*b*, so that the laser module 20 can perform the pivoting movement around the second axis about the shaft portion of the sleeve axis 242*b*. In this embodiment, a shaft hole is provided on the side surface of the laser module 20. The shaft portion of the sleeve axis 242*b* passes through the shaft hole from inside to outside so that the shaft portion and the through hole are exposed outside the side surface of the laser module 20, such that the fixed axis 241*a* penetrates into the through hole of the sleeve axis 242*b* along the first direction, in addition, it also allows the laser module 20 to pivot around the second axis by using the shaft portion of the sleeve axis 242*b* as the pivot.

As shown in FIG. 3A and FIG. 3B, the first adjusting screw set comprises a first screw 141*a*, a first pushing block 142*a* and a first fixing ring 143*a*. By rotating the first screw 141*a*, the first pushing block 142*a* can be driven to push the side surface of the laser module 20 in order to cause the laser module 20 together with the sleeve axis 242*b* to pivot around the first axis by using the fixed axis 241*a* as the pivot. The first screw 141*a* has an internal thread which is screwed with the outer thread of the first pushing block 142*a*, therefore, when the first pushing block 142*a* cannot be rotated due to restriction of the flat bottom groove 211, and there is an external force tending to rotate the first screw 141*a*, the rotational movement of the first screw 141*a* will drive the first pushing block 142*a* to move linearly along the axial direction of its thread. The first fixing ring 143*a* is used to position the first screw 141*a* on the first screw hole 123 on the side surface of the laser module 20, such that, when the first screw 141*a* is rotated by an external force, the first screw 141*a* will be positioned and restricted by the first fixing ring 143*a* and can only perform a simple rotary motion without displacement forward and backward along its axial direction. The second adjusting screw set comprises a second screw 141*b*, a second pushing block 142*b* and a second fixing ring 143*b*. By rotating the second screw 141*b*, the second pushing block 142*b* can be driven to push the bottom surface of the laser module 20 in order to cause the laser module 20 to pivot around the second axis by using the shaft portion of the sleeve axis 242*b* as the pivot. The second screw 141*b* has an internal thread which is screwed with the outer thread of the second pushing block 142*b*, therefore, when the second pushing block 142*b* cannot be rotated due to restriction of another flat bottom groove (not shown in figures), and there is an external force tending to rotate the second screw 141*b*, the rotational movement of the second screw 141*b* will drive the second pushing block 142*b* to move linearly along the axial direction of its thread. The second fixing ring 143*b* is used to position the second screw 141*b* on the second screw hole (not shown in figures) on the bottom surface of the laser module 20, such that, when the second screw 141*b* is rotated by an external force, the second screw 141*b* will be positioned and restricted by the second fixing ring 143*b* and can only perform a simple rotary motion without displacement forward and backward along its axial direction. The adjustment mechanism 14 further comprises at least one position retaining element 25*a*, 25*b*, which respectively abuts between the other side surface and the top surface of the laser module 20 and the case 10. In this embodiment, the position retaining elements 25*a*, 25*b* are conical coil springs, which can provide elastic pushing forces to the other side surface and the top surface of the laser module 20; that is, the position retaining elements 25*a*, 25*b* can provide elastic pushing forces to the laser module 20, so that the first pushing block 142*a* and the second pushing block 142*b* can keep pressing against the laser module 20, such that, when the first screw 141*a* and the second screw 141*b* stop rotating by external forces, the position of the laser module 20 can be maintained by the elastic pushing forces of the position retaining elements 25*a*, 25*b*. Furthermore, a flat bottom groove 211 extending along the first direction is formed on the side surface of the laser module 20, in addition, the first pushing block 142*a* has a square shape with a width substantially matching the width of the flat bottom groove 211. The first pushing block 142*a* is located in the flat bottom groove 211 and abuts against the flat bottom groove 211; such that, when the first screw 141*a* is rotated by an external force, the first pushing block 142*a* cannot be rotated due to the flat bottom groove 211. Therefore, the rotational movement of the first screw 141*a* can be converted into a linear displacement of the first pushing block 142*a* along the axial direction of its thread, so as to achieve the purpose of pushing the laser module 20 to adjust the position of its laser aiming point. Similarly, the bottom surface of the laser module 20 also has a flat bottom groove (not shown in figures) extending in the second direction to restrict the second pushing block 142*b* from rotating. It can be understood from the above descriptions that, the biaxial pivoting mechanism 24 of the invention not only has the advantages of simple structure and easy assembly, but also is very simple in adjusting the position of the laser aiming point of the laser beam emitted by the laser module 20; it does have improved the shortcomings of the prior art laser modules whose position adjustment mechanism is complicated in structure and difficult in assembly.

As shown in FIG. 4 in companion with FIG. 2A, in this embodiment, the magnetic switch with connecting cable 50 of the laser target pointer 1 is magnetically and detachably connected to a contact block 124 provided on a rear side of the lower cover 12 of the case 10 and is further electrically connected to the top-pressing circuit board 40. The magnetic switch with connecting cable 50 comprises: a magnetic attraction head 51, an operation box 52 and a connecting cable 53 extending and connecting between the magnetic attraction head 51 and the operating box 52. The contact block 124 is located in the lower cover 12 and comprises: a hollow outer ring sleeve 512 fixed in the contact block 124, a ring magnet 513 fixed in the outer ring sleeve 512, a spacer 514 having a small hole in the center, and a conductive post 515 inserted into the small hole of the spacer 514 and having a front end of the conductive post 515 to protrude out of the spacer 514. The spacer 514 has a non-conductive inner ring portion 5141 adjacent to the small hole, and an electrically and magnetically conductive metal outer ring portion 5142 surrounding the inner ring portion 5141. The outer ring portion 5142 of the spacer 514 is attracted by the magnetic force of the ring magnet 513 and contacts the ring magnet 513 in order to provide an electric conducting function. An operation button 521 is provided on a top surface of the operation box 52; in addition, a Velcro tape 522 (which can be one of a hook surface or a loop surface) is provided on a bottom surface of the operation box 52. The magnetic attraction head 51 has a container structure furnished with electrically and magnetically conductive components therein. When the magnetic attraction head 51 of the magnetic switch with connecting cable 50 is magnetically attracted by the ring magnet 513 and combined with the contact block 124, a control signal can be generated and transmitted to the top-pressing circuit board 40 by pressing the button 521 on the operation box 52, in order to perform the operation of turning on or off the power supply of the laser target pointer 1 or activating a function selected in advance. The power or function switch for controlling the laser target pointer 1 can be extended away from the body of the laser target pointer 1 and closer to the user's hand by the connecting cable 53 and the operation box 52 of the magnetic switch with connecting cable 50, which allows the user to conveniently press the button 521 on the operation box 52 to operate and activate the power or other pre-selected function of the laser target pointer 1. In other words, according to the user's own operating habits, the carrier (for example, the rifle 92 shown in FIG. 7B) can be selectively pre-bundled with another Velcro tape at a position close to the hand grip (or at a position convenient for the user to operate); and then, the body of the laser target pointer 1 can be assembled at the front end of the rifle 92 near the barrel, while the operation box 52 of the magnetic switch with connecting cable 50 can be bonded to the "another Velcro tape" pre-bundled close to the hand grip of the carrier by using the Velcro tape 522 provided on the bottom surface of the operation box 52. And then, the magnetic attraction head 51 of the magnetic switch with connecting cable 50 can be magnetically attached to the contact block 124 of the laser target pointer 1. In this way, the user can easily and conveniently press the button 521 on the operation box 52 with a finger (such as a thumb) without moving his/her palm originally held on the hand grip of the carrier, so as to operate and activate the power or other pre-selected function of the laser target pointer 1. It can be understood from the above description that, in the laser target pointer 1 of the present invention, the operation box 52 of the magnetic switch with connecting cable 50 can be attached on various locations of the carrier (any location convenient for the user to operate) by placing; such that, the power or pre-selected function of the laser target pointer 1 can be conveniently turned on and off by operating the button 521 on the operation box 52, and thus has improved the shortcomings of the inconvenient operations of the function buttons and/or power switches of the laser target pointer of the prior art.

Figure 1C:
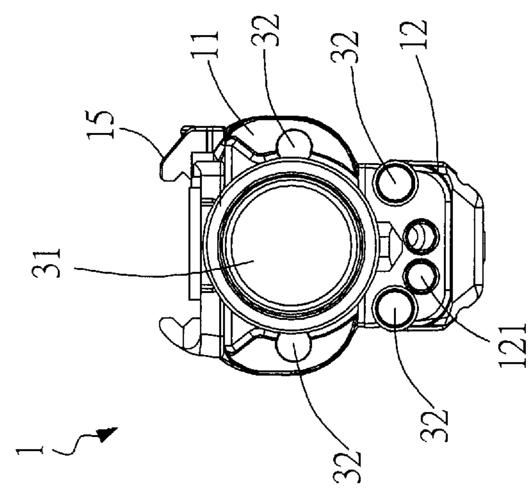
FIG. 1C is a front side view of the embodiment of assembled laser target pointer of the present invention.

As shown in FIG. 1A, FIG. 1C, FIG. 2A, and in companion with FIG. 3A, in this embodiment of the laser target pointer 1 of the present invention, the laser units 22 of the laser module 20 includes a visible-light laser diode 221 and an invisible-light laser diode 222 used for emitting visible laser beam and invisible laser beam respectively, in which, the laser beams are emitted out of the case 10 through the small holes 121 on the front side of the lower cover 12. The rear ends of the visible-light laser diode 221 and the invisible-light laser diode 222 respectively have a plurality of conductive pins 2211, 2221 which are soldered to a connecting circuit board 23 located on the rear side of the laser module 20, and then electrically connected to the top-pressing circuit board 40 via the connecting circuit board 23. When the user wishes to see the aiming point marked by the laser beam emitted by the laser module 20 with naked eyes, the user can select and enable the visible-light laser diode 221 to emit visible laser beam. When the user is wearing night vision goggles and hopes that the laser beam and its aiming point emitted by the laser module 20 can only be seen through the night vision goggles and cannot be seen by naked eyes, then the function of invisible-light laser diode 222 can be selected and turned on in order to emit invisible laser beam (for example, but not limited to: infrared laser beam).

The at least one light emitting element 31, 32 of the lighting module 30 includes a visible light emitting diode (light emitting element 31) and a plurality of invisible light emitting diodes (light emitting elements 32). The visible light emitting diode (light emitting element 31) is located on the front cover 13 and is used to emit visible illumination light of greater power. The plurality of invisible light emitting diodes (light emitting elements 32) are respectively located on the lower cover 12 and the front cover 13 and are used to emit invisible illumination light. When the user wishes to see the objects illuminated by the illumination light emitted by the lighting module 30 with his/her naked eyes, he/she can select and turn on the function of visible light illumination emitted by the visible light emitting diode (light emitting element 31). When the user is wearing night vision goggles and hopes that the objects illuminated by the lighting module 30 can only be seen through the night vision goggles and cannot be seen by naked eyes, then the function of invisible light emitting diodes (light emitting elements 32) can be selected and turned on in order to emit invisible illumination light (for example, but not limited to: infrared illumination light). It is well known in the art that, when the angle of divergence of the illuminating light is greater, then the range of illumination that can be clearly illuminated will be wider, but the distance of clear illumination will be shorter. Vice versa, when the angle of divergence of the illuminating light is smaller, then the range of illumination that can be clearly illuminated will be narrower, but the distance of clear illumination will be longer. Because in the conventional technology of laser target pointer, one or several invisible light emitting diodes (light-emitting elements) having the same divergence angle are used to provide invisible illumination light, such that the conventional laser target pointer can only choose between a wide range of short-distance illumination capability or a long-distance but narrow-range illumination capability; it is impossible for the conventional laser target pointer to provide both the wide range illumination and the long-distance illumination capabilities. In contrast, in the present invention, the divergence angles of the invisible illumination light emitted by the plurality of invisible light emitting diodes (light emitting elements 32) are different. Therefore, it can meet the lighting requirements of different illumination distances and divergent angles, so as to achieve the advantages of both wide-range and long-distance illumination capabilities. As shown in FIG. 5, the divergence angles of the invisible illumination light emitted by the four invisible light emitting diodes (light emitting elements 32) in the lighting module 30 of the laser target pointer 1 of the present creation are different from each other, for example, but not limited to: 7-8 degrees, 15 degrees, 30 degrees, and 60 degrees. The effective illumination range and distance of the invisible illumination light emitted by each invisible light emitting diode (light emitting element 32) are represented by the illumination ranges 3201, 3202, 3203, and 3204, respectively. That is, two of the invisible light emitting diodes (light emitting elements 32) with light divergence angles of 7 to 8 degrees and 15 degrees are for providing invisible illumination light at longer distances and narrower ranges; in the meantime, the other two invisible light emitting diodes (light emitting elements 32) with light divergence angles of 30 degrees and 60 degrees are used to provide invisible illumination light at shorter distances but wider ranges. It can be seen from FIG. 5 that, the laser target pointer of the present invention provides a plurality of invisible light emitting diodes; the divergence angles of the invisible illumination light emitted by the invisible light emitting diodes are different from each other, so as to meet the lighting requirements of different irradiation distances and ranges, and thus has improved the shortcomings of the restricted illumination distance or range of the laser target pointer of the prior art.

As shown in FIG. 6A and FIG. 6B, in this embodiment of the laser target pointer 1 of the present invention, the operating module is electrically connected to the top-pressing circuit board 40 and includes: a plurality of buttons 61 and a plurality of patterns 70 which can be switched between a luminous status and a darkness status. Each of the patterns 70 corresponds to at least one operation function. By pressing one or more buttons 61, one or some of the patterns 70 will be switched to the luminous status for emitting light of a predetermined color in order to identify which operation function or functions of the laser target pointer 1 are currently enabled. Wherein, at least some of the patterns 70 can emit at least two different colors of light, so that a single pattern 70 can be used to identify at least two different operation functions. In this embodiment, the plurality of buttons 61 are provided on the lower cover 12. The plurality of patterns 70 are arranged on a back cover of the main body 11 and comprise: an illumination pattern 71, a lasing pattern 72, a power-on pattern 73 (FIRE), and an invisible light pattern 74 (ILLU). In which, when the visible light operation is selected, the bright white light of the illumination pattern 71 indicates that a visible light illumination function of the lighting module 30 is selected. The green light of the laser pattern 72 indicates that a visible laser function of the laser module 20 is selected. Both the visible light illumination function and the visible light laser function can be selected independently, or both can be selected at the same time. When performing invisible light operation selections, the red light of the invisible light pattern 74 indicates that an invisible light illumination function of the lighting module 30 is selected. The orange light of the laser pattern 72 indicates that an invisible laser function of the laser module 20 is selected. Both the invisible light illumination function and the invisible light laser function can be selected independently, or both can be selected at the same time. The visible light illumination function and the invisible light illumination function cannot be selected at the same time; in addition, the visible laser function and the invisible laser function cannot be selected at the same time. When the power-on pattern 73 lights up in blue, it means that the selected function(s) is/are being activated. In this embodiment, the operation of pressing the button 521 on the operation box 52 of the magnetic switch with connecting cable 50 is used to control (turn on or off) the blue light of the power-on pattern 73, that is, to control whether the selected function is activated or not. Wherein, two sets of the patterns 70 are respectively provided on the left half and the right half of the back cover, in addition, two sets of buttons 61 are respectively provided on the left half and the right half of the lower cover 12. In this way, different users with a left-handed gun and a right-handed gun can conveniently operate the buttons 61 and view the plurality of patterns 70, which does improve the shortcoming of the poor visibility of the function menu of the laser target pointer of the prior art.

FIGS. 7A and 7B are schematic drawings respectively showing the laser target pointer of the present invention being equipped on a pistol and a rifle. It can be seen from FIG. 7A that, when the laser target pointer 1 of the present invention is assembled on a pistol 91 or other short gun, the back cover part of the main body 11 of the laser target pointer 1 will be very close to the trigger of the pistol. For conventional laser target pointers in the arts, the back cover of the laser target pointer is used to be opened for replacing the battery; therefore, conventional laser target pointers cannot replace the battery when they are installed on the pistol. Instead, the conventional laser target pointers must be removed from the pistol before the battery can be replaced, which is very inconvenient. In contrast, since the laser target pointer 1 of the present invention is to replace the battery by opening the front cover 13 from the front side of the case 10, therefore, even if the laser target pointer 1 of the present invention is mounted on the pistol 91 as shown in FIG. 7A, the battery (power module 60) can still be replaced by directly opening the front cover 13 without the need to remove the laser target pointer 1 first, and thus is very convenient. Moreover, it can be seen from FIG. 7B that, when the laser target pointer 1 of the present invention is assembled on a rifle 92 or other long guns, the location of the laser target pointer 1 will be far away from another location where the user generally holds the rifle/gun (such as the grip), and thus is inconvenient for the user to directly operate the buttons 61 furnished on the case 10 of the laser target pointer 1. In contrast, since the laser target pointer 1 of the present invention includes a novel magnetic switch with connecting cable 50 whose operation box 52 can be placed at any desirable position of the carrier (rifle 92), for example, but not limited to, the grip or any other user-friendly position as shown in FIG. 7B, the user can press the button 521 on the operation box 52 to switch on or off the power of the laser target pointer or other pre-selected functions without releasing his/her hand from the grip of the carrier (rifle 92), which does improve the shortcoming of the inconvenient operation of the function buttons and switches of the laser target pointer of the prior art.

While the present invention has been particularly shown and described with reference to a preferred embodiment, it will be understood by those skilled in the art that various changes in form and detail may be without departing from the spirit and scope of the present invention.

What is claimed is:

1. A laser target pointer comprising:

a case;

a lighting module, located in the case and comprising at least one light emitting element for emitting illumination light forwardly out from the case;

a laser module, located inside the case and comprising at least one laser unit for emitting laser beam forwardly out from the case;

a power module, located inside the case and electrically connected to the lighting module and the laser module to provide electric power to the at least one light emitting element and the at least one laser unit;

an operating module, electrically connected to the power module; said operating module comprising at least one button which can be pressed by a user in order to operate the laser target pointer; and an adjustment mechanism, connected with the laser module for adjusting a position of a laser aiming point of a laser beam emitted by the at least one laser unit of the laser module; the adjustment mechanism comprising: a biaxial pivoting mechanism, a first adjusting screw set and a second adjusting screw set;

wherein, a side surface of the laser module is pivotally coupled to the biaxial pivoting mechanism, such that the laser module can use the biaxial pivoting mechanism as a pivot to perform biaxial pivoting movements according to a first axis and a second axis;

wherein, the first adjusting screw set is disposed on the side surface of the laser module in such a manner that, by rotating the first adjusting screw set, the side surface of the laser module will be pushed by the first adjusting screw set to rotate around the first axis using the biaxial pivoting mechanism as the pivot; in addition, the second adjusting screw set is disposed on a bottom surface of the laser module in such a manner that, by rotating the second adjusting screw set, the bottom surface of the laser module will be pushed by the second adjusting screw set to rotate around the second axis using the biaxial pivoting mechanism as the pivot;

wherein, by rotating the first adjusting screw set and the second adjusting screw set, the laser module can perform biaxial pivoting movements using the biaxial pivoting mechanism as the pivot, so as to adjust the position of the laser aiming point of the laser beam emitted by the at least one laser unit.

2. The laser target pointer of claim 1, wherein the biaxial pivoting mechanism comprises a fixed axis and a sleeve axis; the fixed axis extends along a first direction and is fixed to the case; the sleeve axis has a through hole extending in the first direction and a shaft portion extending in a second direction, wherein the second direction is perpendicular to the first direction; the through hole of the sleeve axis is sleeved on the fixed axis in a pivotable manner, so that the sleeve axis can perform pivoting movements around the first axis about the fixed axis; the side surface of the laser module is pivotally coupled to the shaft portion of the sleeve axis, so that the laser module can perform the pivoting movements around the second axis about the shaft portion of the sleeve axis;

wherein, the first adjusting screw set comprises a first screw and a first pushing block; by rotating the first screw, the first pushing block can be driven to push the side surface of the laser module in order to cause the laser module together with the sleeve axis to pivot around the first axis by using the fixed axis as the pivot;

wherein, the second adjusting screw set comprises a second screw and a second pushing block; by rotating the second screw, the second pushing block can be driven to push the bottom surface of the laser module in order to cause the laser module to pivot around the second axis by using the shaft portion of the sleeve axis as the pivot;

wherein, the adjustment mechanism further comprises at least one position retaining element for providing an elastic pushing force to the laser module, so that, when the first screw and the second screw stop rotating, the position of the laser module can be maintained by the elastic pushing force of the at least one position retaining element.

3. The laser target pointer of claim 2, wherein, a flat bottom groove extending along the first direction is formed on the side surface of the laser module, in addition, the first pushing block has a square shape with a width substantially matching a width of the flat bottom groove; the first pushing block is located in the flat bottom groove and abuts against the flat bottom groove; the position retaining element is a conical coil spring which abuts the laser module and the case for providing the elastic pushing force to the laser module, so that the first pushing block and the second pushing block can keep pressing against the laser module.

4. The laser target pointer of claim 1, wherein, the case comprises: a main body, a lower cover and a front cover; the lower cover is assembled and fixed under the main body, while the front cover is connected to a front side of the main body in a detachable manner; the power module comprises at least a battery and is received inside the main body; the front cover is locked to the front side of the main body by a clipping mechanism; when the clipping mechanism is unlocked, the front cover can be detached from the main body in order to expose the at least one battery for battery replacement; the laser module and the adjustment mechanism are located in the lower cover, and are electrically connected to the power module through a top-pressing circuit board; the top-pressing circuit board is provided with various electronic components for controlling the laser target pointer; the laser target pointer further comprises an adjustable fixing rack disposed on a top surface of the main body; the fixing rack is for mounting the laser target pointer onto a carrier in a detachable manner.

5. The laser target pointer of claim 4, wherein, the laser target pointer further comprises a magnetic switch with connecting cable which is magnetically and detachably connected to a contact block provided on a rear side of the lower cover of the case and is further electrically connected to the top-pressing circuit board; the magnetic switch with connecting cable comprises: a magnetic attraction head, an operation box and a connecting cable extending and connecting between the magnetic attraction head and the operating box; the contact block is located in the lower cover and comprises: a hollow outer ring sleeve fixed in the contact block, a ring magnet fixed in the outer ring sleeve, a spacer having a small hole in the center, and a conductive post inserted into the small hole of the spacer and having a front end of the conductive post to protrude out of the spacer; the spacer has a non-conductive inner ring portion adjacent to the small hole, and an electrically and magnetically conductive metal outer ring portion surrounding the inner ring portion; the outer ring portion of the spacer is attracted by the magnetic force of the ring magnet and contacts the ring magnet in order to provide an electric conducting function; an operation button is provided on the operation box; the magnetic attraction head has a container structure furnished with electrically and magnetically conductive components therein; when the magnetic attraction head of the magnetic switch with connecting cable is magnetically attracted by the ring magnet and combined with the contact block, a control signal can be generated and transmitted to the top-pressing circuit board by pressing the button on the operation box, in order to perform the operation of turning on or off the power supply of the laser target pointer.

6. The laser target pointer of claim 4, wherein, the at least one laser unit of the laser module includes a visible-light laser diode and an invisible-light laser diode used for emitting visible laser beam and invisible laser beam respectively; the at least one light emitting element of the lighting module includes a visible light emitting diode and a plurality of invisible light emitting diodes; the visible light emitting diode is located on the front cover and is used to emit visible illumination light; the plurality of invisible light emitting diodes are respectively located on the lower cover and the front cover and are used to emit invisible illumination light; wherein, divergence angles of the invisible illumination light emitted by the plurality of invisible light emitting diodes are different in order to meet lighting requirements of different illumination distances and divergent angles.

7. The laser target pointer of claim 4, wherein, the operating module is electrically connected to the top-pressing circuit board and includes: a plurality of buttons and a plurality of patterns which can be switched between a luminous status and a darkness status; each of the patterns corresponds to at least one operation function; by pressing one or more said buttons, one or some of the patterns will be switched to the luminous status for emitting light of a predetermined color in order to identify which operation function or functions of the laser target pointer are currently enabled; wherein, at least one of the patterns can emit at least two different colors of light, so that a single said pattern can be used to identify at least two different said operation functions.

8. The laser target pointer of claim 7, wherein, the plurality of buttons are provided on the lower cover; the plurality of patterns are arranged on a back cover of the main body and comprise: an illumination pattern, a lasing pattern, a power-on pattern, and an invisible light pattern; wherein:

when performing visible light operation selections, a bright white light of the illumination pattern indicates that a visible light illumination function of the lighting module is selected; a green light of the laser pattern indicates that a visible laser function of the laser module is selected; both the visible light illumination function and the visible light laser function can be selected independently, or both can be selected at the same time;

when performing invisible light operation selections, a red light of the invisible light pattern indicates that an invisible light illumination function of the lighting module is selected; an orange light of the laser pattern indicates that an invisible laser function of the laser module is selected; both the invisible light illumination function and the invisible light laser function can be selected independently, or both can be selected at the same time;

the visible light illumination function and the invisible light illumination function cannot be selected at the same time; in addition, the visible laser function and the invisible laser function cannot be selected at the same time;

when the power-on pattern lights up in blue, it means that the selected function(s) is/are being activated;

wherein, two sets of the patterns are respectively provided on a left half and a right half of the back cover, in addition, two sets of buttons are respectively provided on a left half and a right half of the lower cover; such that, different users with a left-handed gun and a right-handed gun can conveniently operate the buttons and view the plurality of patterns.

9. A laser target pointer comprising:

a case;

a lighting module, located in the case and comprising at least one light emitting element for emitting illumination light forwardly out from the case;

a laser module, located inside the case and comprising at least one laser unit for emitting laser beam forwardly out from the case;

a power module, located inside the case and electrically connected to the lighting module and the laser module to provide electric power to the at least one light emitting element and the at least one laser unit;

an operating module, electrically connected to the power module; said operating module comprising at least one button which can be pressed by a user in order to operate the laser target pointer; and an adjustment mechanism, connected with the laser module for adjusting a position of a laser aiming point of a laser beam emitted by the at least one laser unit of the laser module;

wherein, the case comprises: a main body, a lower cover and a front cover; the lower cover is assembled and fixed under the main body, while the front cover is connected to a front side of the main body in a detachable manner; the power module comprises at least a battery and is received inside the main body; the front cover is locked to the front side of the main body by a clipping mechanism; when the clipping mechanism is unlocked, the front cover can be detached from the main body in order to expose the at least one battery for battery replacement; the laser module and the adjustment mechanism are located in the lower cover, and are electrically connected to the power module through a top-pressing circuit board; the top-pressing circuit board is provided with various electronic components for controlling the laser target pointer; the laser target pointer further comprises an adjustable fixing rack disposed on a top surface of the main body; the fixing rack is for mounting the laser target pointer onto a carrier in a detachable manner;

wherein, the laser target pointer further comprises a magnetic switch with connecting cable which is magnetically and detachably connected to a contact block provided on a rear side of the lower cover of the case and is further electrically connected to the top-pressing circuit board; the magnetic switch with connecting cable comprises: a magnetic attraction head, an operation box and a connecting cable extending and connecting between the magnetic attraction head and the operating box; the contact block is located in the lower cover and comprises: a hollow outer ring sleeve fixed in the contact block, a ring magnet fixed in the outer ring sleeve, a spacer having a small hole in the center, and a conductive post inserted into the small hole of the spacer and having a front end of the conductive post to protrude out of the spacer; the spacer has a non-conductive inner ring portion adjacent to the small hole, and an electrically and magnetically conductive metal outer ring portion surrounding the inner ring portion; the outer ring portion of the spacer is attracted by the magnetic force of the ring magnet and contacts the ring magnet in order to provide an electric conducting function; an operation button is provided on the operation box; the magnetic attraction head has a container structure furnished with electrically and magnetically conductive components therein; when the magnetic attraction head of the magnetic switch with connecting cable is magnetically attracted by the ring magnet and combined with the contact block, a control signal can be generated and transmitted to the top-pressing circuit board by pressing the button on the operation box, in order to perform the operation of turning on or off the power supply of the laser target pointer.

10. The laser target pointer of claim 9, wherein:

the adjustment mechanism comprising: a biaxial pivoting mechanism, a first adjusting screw set and a second adjusting screw set; a side surface of the laser module is pivotally coupled to the biaxial pivoting mechanism, such that the laser module can use the biaxial pivoting mechanism as a pivot to perform biaxial pivoting movements according to a first axis and a second axis;

the first adjusting screw set is disposed on the side surface of the laser module in such a manner that, by rotating the first adjusting screw set, the side surface of the laser module will be pushed by the first adjusting screw set to rotate around the first axis using the biaxial pivoting mechanism as the pivot; in addition, the second adjusting screw set is disposed on a bottom surface of the laser module in such a manner that, by rotating the second adjusting screw set, the bottom surface of the laser module will be pushed by the second adjusting screw set to rotate around the second axis using the biaxial pivoting mechanism as the pivot;

by rotating the first adjusting screw set and the second adjusting screw set, the laser module can perform biaxial pivoting movements using the biaxial pivoting mechanism as the pivot, so as to adjust the position of the laser aiming point of the laser beam emitted by the at least one laser unit;

the biaxial pivoting mechanism comprises a fixed axis and a sleeve axis; the fixed axis extends along a first direction and is fixed to the case; the sleeve axis has a through hole extending in the first direction and a shaft portion extending in a second direction, wherein the second direction is perpendicular to the first direction; the through hole of the sleeve axis is sleeved on the fixed axis in a pivotable manner, so that the sleeve axis can perform pivoting movements around the first axis about the fixed axis; the side surface of the laser module is pivotally coupled to the shaft portion of the sleeve axis, so that the laser module can perform the pivoting movements around the second axis about the shaft portion of the sleeve axis;

the first adjusting screw set comprises a first screw and a first pushing block; by rotating the first screw, the first pushing block can be driven to push the side surface of the laser module in order to cause the laser module together with the sleeve axis to pivot around the first axis by using the fixed axis as the pivot;

the second adjusting screw set comprises a second screw and a second pushing block; by rotating the second screw, the second pushing block can be driven to push the bottom surface of the laser module in order to cause the laser module to pivot around the second axis by using the shaft portion of the sleeve axis as the pivot;

the adjustment mechanism further comprises at least one position retaining element for providing an elastic pushing force to the laser module, so that, when the first screw and the second screw stop rotating, the position of the laser module can be maintained by the elastic pushing force of the at least one position retaining element;

a flat bottom groove extending along the first direction is formed on the side surface of the laser module, in addition, the first pushing block has a square shape with a width substantially matching a width of the flat bottom groove; the first pushing block is located in the flat bottom groove and abuts against the flat bottom groove; the position retaining element is a conical coil spring which abuts the laser module and the case for providing the elastic pushing force to the laser module, so that the first pushing block and the second pushing block can keep pressing against the laser module.

11. The laser target pointer of claim 9, wherein, wherein, the at least one laser unit of the laser module includes a visible-light laser diode and an invisible-light laser diode used for emitting visible laser beam and invisible laser beam respectively; the at least one light emitting element of the lighting module includes a visible light emitting diode and a plurality of invisible light emitting diodes; the visible light emitting diode is located on the front cover and is used to emit visible illumination light; the plurality of invisible light emitting diodes are respectively located on the lower cover and the front cover and are used to emit invisible illumination light; wherein, divergence angles of the invisible illumination light emitted by the plurality of invisible light emitting diodes are different in order to meet lighting requirements of different illumination distances and divergent angles.

12. The laser target pointer of claim 9, wherein:

the operating module is electrically connected to the top-pressing circuit board and includes: a plurality of buttons and a plurality of patterns which can be switched between a luminous status and a darkness status; each of the patterns corresponds to at least one operation function; by pressing one or more said buttons, one or some of the patterns will be switched to the luminous status for emitting light of a predetermined color in order to identify which operation function or functions of the laser target pointer are currently enabled; wherein, at least one of the patterns can emit at least two different colors of light, so that a single said pattern can be used to identify at least two different said operation functions;

the plurality of buttons are provided on the lower cover; the plurality of patterns are arranged on a back cover of the main body and comprise: an illumination pattern, a lasing pattern, a power-on pattern, and an invisible light pattern;

when performing visible light operation selections, a bright white light of the illumination pattern indicates that a visible light illumination function of the lighting module is selected; a green light of the laser pattern indicates that a visible laser function of the laser module is selected; both the visible light illumination function and the visible light laser function can be selected independently, or both can be selected at the same time;

when performing invisible light operation selections, a red light of the invisible light pattern indicates that an invisible light illumination function of the lighting module is selected; an orange light of the laser pattern indicates that an invisible laser function of the laser module is selected; both the invisible light illumination function and the invisible light laser function can be selected independently, or both can be selected at the same time;

the visible light illumination function and the invisible light illumination function cannot be selected at the same time; in addition, the visible laser function and the invisible laser function cannot be selected at the same time;

when the power-on pattern lights up in blue, it means that the selected function(s) is/are being activated;

wherein, two sets of the patterns are respectively provided on a left half and a right half of the back cover, in addition, two sets of buttons are respectively provided on a left half and a right half of the lower cover; such that, different users with a left-handed gun and a right-handed gun can conveniently operate the buttons and view the plurality of patterns.

13. A laser target pointer comprising:

a case;

a lighting module, located in the case and comprising at least one light emitting element for emitting illumination light forwardly out from the case;

a laser module, located inside the case and comprising at least one laser unit for emitting laser beam forwardly out from the case;

a power module, located inside the case and electrically connected to the lighting module and the laser module to provide electric power to the at least one light emitting element and the at least one laser unit;

an operating module, electrically connected to the power module; said operating module comprising at least one button which can be pressed by a user in order to operate the laser target pointer; and an adjustment mechanism, connected with the laser module for adjusting a position of a laser aiming point of a laser beam emitted by the at least one laser unit of the laser module;

wherein, the case comprises: a main body, a lower cover and a front cover; the lower cover is assembled and fixed under the main body, while the front cover is connected to a front side of the main body in a detachable manner; the power module comprises at least a battery and is received inside the main body; the front cover is locked to the front side of the main body by a clipping mechanism; when the clipping mechanism is unlocked, the front cover can be detached from the main body in order to expose the at least one battery for battery replacement; the laser module and the adjustment mechanism are located in the lower cover, and are electrically connected to the power module through a top-pressing circuit board; the top-pressing circuit board is provided with various electronic components for controlling the laser target pointer; the laser target pointer further comprises an adjustable fixing rack disposed on a top surface of the main body; the fixing rack is for mounting the laser target pointer onto a carrier in a detachable manner;

wherein, the at least one laser unit of the laser module includes a visible-light laser diode and an invisible-light laser diode used for emitting visible laser beam and invisible laser beam respectively; the at least one light emitting element of the lighting module includes a visible light emitting diode and a plurality of invisible light emitting diodes; the visible light emitting diode is located on the front cover and is used to emit visible illumination light; the plurality of invisible light emitting diodes are respectively located on the lower cover and the front cover and are used to emit invisible illumination light; wherein, divergence angles of the invisible illumination light emitted by the plurality of invisible light emitting diodes are different in order to meet lighting requirements of different illumination distances and divergent angles.

14. The laser target pointer of claim 13, wherein:

the adjustment mechanism comprising: a biaxial pivoting mechanism, a first adjusting screw set and a second adjusting screw set; a side surface of the laser module is pivotally coupled to the biaxial pivoting mechanism, such that the laser module can use the biaxial pivoting mechanism as a pivot to perform biaxial pivoting movements according to a first axis and a second axis;

the first adjusting screw set is disposed on the side surface of the laser module in such a manner that, by rotating the first adjusting screw set, the side surface of the laser module will be pushed by the first adjusting screw set to rotate around the first axis using the biaxial pivoting mechanism as the pivot; in addition, the second adjusting screw set is disposed on a bottom surface of the laser module in such a manner that, by rotating the second adjusting screw set, the bottom surface of the laser module will be pushed by the second adjusting screw set to rotate around the second axis using the biaxial pivoting mechanism as the pivot;

by rotating the first adjusting screw set and the second adjusting screw set, the laser module can perform biaxial pivoting movements using the biaxial pivoting mechanism as the pivot, so as to adjust the position of the laser aiming point of the laser beam emitted by the at least one laser unit;

the biaxial pivoting mechanism comprises a fixed axis and a sleeve axis; the fixed axis extends along a first direction and is fixed to the case; the sleeve axis has a through hole extending in the first direction and a shaft portion extending in a second direction, wherein the second direction is perpendicular to the first direction; the through hole of the sleeve axis is sleeved on the fixed axis in a pivotable manner, so that the sleeve axis can perform pivoting movements around the first axis about the fixed axis; the side surface of the laser module is pivotally coupled to the shaft portion of the sleeve axis, so that the laser module can perform the pivoting movements around the second axis about the shaft portion of the sleeve axis;

the first adjusting screw set comprises a first screw and a first pushing block; by rotating the first screw, the first pushing block can be driven to push the side surface of the laser module in order to cause the laser module together with the sleeve axis to pivot around the first axis by using the fixed axis as the pivot;

the second adjusting screw set comprises a second screw and a second pushing block; by rotating the second screw, the second pushing block can be driven to push the bottom surface of the laser module in order to cause the laser module to pivot around the second axis by using the shaft portion of the sleeve axis as the pivot;

the adjustment mechanism further comprises at least one position retaining element for providing an elastic pushing force to the laser module, so that, when the first screw and the second screw stop rotating, the position of the laser module can be maintained by the elastic pushing force of the at least one position retaining element;

a flat bottom groove extending along the first direction is formed on the side surface of the laser module, in addition, the first pushing block has a square shape with a width substantially matching a width of the flat bottom groove; the first pushing block is located in the flat bottom groove and abuts against the flat bottom groove; the position retaining element is a conical coil spring which abuts the laser module and the case for providing the elastic pushing force to the laser module, so that the first pushing block and the second pushing block can keep pressing against the laser module.

15. The laser target pointer of claim 13, wherein, the laser target pointer further comprises a magnetic switch with connecting cable which is magnetically and detachably connected to a contact block provided on a rear side of the lower cover of the case and is further electrically connected to the top-pressing circuit board; the magnetic switch with connecting cable comprises: a magnetic attraction head, an operation box and a connecting cable extending and connecting between the magnetic attraction head and the operating box; the contact block is located in the lower cover and comprises: a hollow outer ring sleeve fixed in the contact block, a ring magnet fixed in the outer ring sleeve, a spacer having a small hole in the center, and a conductive post inserted into the small hole of the spacer and having a front end of the conductive post to protrude out of the spacer; the spacer has a non-conductive inner ring portion adjacent to the small hole, and an electrically and magnetically conductive metal outer ring portion surrounding the inner ring portion; the outer ring portion of the spacer is attracted by the magnetic force of the ring magnet and contacts the ring magnet in order to provide an electric conducting function; an operation button is provided on the operation box; the magnetic attraction head has a container structure furnished with electrically and magnetically conductive components therein; when the magnetic attraction head of the magnetic switch with connecting cable is magnetically attracted by the ring magnet and combined with the contact block, a control signal can be generated and transmitted to the top-pressing circuit board by pressing the button on the operation box, in order to perform the operation of turning on or off the power supply of the laser target pointer.

16. The laser target pointer of claim 13, wherein:

the operating module is electrically connected to the top-pressing circuit board and includes: a plurality of buttons and a plurality of patterns which can be switched between a luminous status and a darkness status; each of the patterns corresponds to at least one operation function; by pressing one or more said buttons, one or some of the patterns will be switched to the luminous status for emitting light of a predetermined color in order to identify which operation function or functions of the laser target pointer are currently enabled; wherein, at least one of the patterns can emit at least two different colors of light, so that a single said pattern can be used to identify at least two different said operation functions;

the plurality of buttons are provided on the lower cover; the plurality of patterns are arranged on a back cover of the main body and comprise: an illumination pattern, a lasing pattern, a power-on pattern, and an invisible light pattern;

when performing visible light operation selections, a bright white light of the illumination pattern indicates that a visible light illumination function of the lighting module is selected; a green light of the laser pattern indicates that a visible laser function of the laser module is selected; both the visible light illumination function and the visible light laser function can be selected independently, or both can be selected at the same time;

when performing invisible light operation selections, a red light of the invisible light pattern indicates that an invisible light illumination function of the lighting module is selected; an orange light of the laser pattern indicates that an invisible laser function of the laser module is selected; both the invisible light illumination function and the invisible light laser function can be selected independently, or both can be selected at the same time;

the visible light illumination function and the invisible light illumination function cannot be selected at the same time; in addition, the visible laser function and the invisible laser function cannot be selected at the same time;

when the power-on pattern lights up in blue, it means that the selected function(s) is/are being activated;

wherein, two sets of the patterns are respectively provided on a left half and a right half of the back cover, in addition, two sets of buttons are respectively provided on a left half and a right half of the lower cover; such that, different users with a left-handed gun and a right-handed gun can conveniently operate the buttons and view the plurality of patterns.

* * * * *